(12) United States Patent
Lo et al.

(10) Patent No.: US 8,954,653 B1
(45) Date of Patent: Feb. 10, 2015

(54) MECHANISMS FOR EFFICIENT MANAGEMENT OF SYSTEM DATA IN DATA STORAGE SYSTEMS

(75) Inventors: Jerry Lo, Hacienda Heights, CA (US); Johnny A. Lam, Firestone, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 227 days.

(21) Appl. No.: 13/533,529

(22) Filed: Jun. 26, 2012

(51) Int. Cl.
*G06F 12/00* (2006.01)

(52) U.S. Cl.
USPC .................... 711/103; 711/134; 711/E12.001

(58) Field of Classification Search
CPC .............. G06F 12/0246; G06F 3/0679; G06F 2212/7202; G06F 2212/7205; G06F 2212/2022; G06F 2212/7211
USPC .................................. 711/103, 134, E12.001
See application file for complete search history.

(56) References Cited

U.S. PATENT DOCUMENTS

| | | | |
|---|---|---|---|
| 6,856,556 | B1 | 2/2005 | Hajeck |
| 7,126,857 | B2 | 10/2006 | Hajeck |
| 7,430,136 | B2 | 9/2008 | Merry, Jr. et al. |
| 7,447,807 | B1 | 11/2008 | Merry et al. |
| 7,502,256 | B2 | 3/2009 | Merry, Jr. et al. |
| 7,509,441 | B1 | 3/2009 | Merry et al. |
| 7,596,643 | B2 | 9/2009 | Merry, Jr. et al. |
| 7,653,778 | B2 | 1/2010 | Merry, Jr. et al. |
| 7,685,337 | B2 | 3/2010 | Merry, Jr. et al. |
| 7,685,338 | B2 | 3/2010 | Merry, Jr. et al. |
| 7,685,374 | B2 | 3/2010 | Diggs et al. |
| 7,733,712 | B1 | 6/2010 | Walston et al. |
| 7,765,373 | B1 | 7/2010 | Merry et al. |
| 7,898,855 | B2 | 3/2011 | Merry, Jr. et al. |
| 7,912,991 | B1 | 3/2011 | Merry et al. |
| 7,936,603 | B2 | 5/2011 | Merry, Jr. et al. |
| 7,962,792 | B2 | 6/2011 | Diggs et al. |
| 8,078,918 | B2 | 12/2011 | Diggs et al. |
| 8,090,899 | B1 | 1/2012 | Syu |
| 8,095,851 | B2 | 1/2012 | Diggs et al. |
| 8,108,692 | B1 | 1/2012 | Merry et al. |
| 8,122,185 | B2 | 2/2012 | Merry, Jr. et al. |
| 8,127,048 | B1 | 2/2012 | Merry et al. |
| 8,135,903 | B1 | 3/2012 | Kan |
| 8,151,020 | B2 | 4/2012 | Merry, Jr. et al. |
| 8,161,227 | B1 | 4/2012 | Diggs et al. |
| 8,166,245 | B2 | 4/2012 | Diggs et al. |
| 8,243,525 | B1 | 8/2012 | Kan |
| 8,254,172 | B1 | 8/2012 | Kan |
| 8,261,012 | B2 | 9/2012 | Kan |
| 8,296,625 | B2 | 10/2012 | Diggs et al. |
| 8,312,207 | B2 | 11/2012 | Merry, Jr. et al. |
| 8,316,176 | B1 | 11/2012 | Phan et al. |
| 8,341,339 | B1 | 12/2012 | Boyle et al. |
| 8,375,151 | B1 | 2/2013 | Kan |
| 8,392,635 | B2 | 3/2013 | Booth et al. |

(Continued)

*Primary Examiner* — Yong Choe (57) ABSTRACT

A data storage system configured to efficiently manage system data, efficiently organize system data, and reduce system data redundancy is disclosed. In one embodiment, the data storage system can maintain memory allocation information configured to track defective allocation units. Memory allocation information can be further configured to provide information for locating the memory allocation units or memory locations in physical memory. Separate information that indicates locations of the data allocation units or memory locations and/or records defective memory locations may not be needed. Hence, redundancy can be reduced, efficiency can be increased, and improved performance can be attained.

20 Claims, 7 Drawing Sheets

(56) References Cited

U.S. PATENT DOCUMENTS

| | | |
|---|---|---|
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2009/0327590 A1 | 12/2009 | Moshayedi |
| 2009/0327591 A1 | 12/2009 | Moshayedi |
| 2010/0174849 A1 | 7/2010 | Walston et al. |
| 2010/0250793 A1 | 9/2010 | Syu |
| 2011/0099323 A1 | 4/2011 | Syu |
| 2011/0185113 A1 | 7/2011 | Goss et al. |
| 2011/0231623 A1 | 9/2011 | Goss et al. |
| 2011/0283049 A1 | 11/2011 | Kang et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

MECHANISMS FOR EFFICIENT MANAGEMENT OF SYSTEM DATA IN DATA STORAGE SYSTEMS

BACKGROUND

1. Technical Field

This disclosure relates to data storage systems for computer systems. More particularly, the disclosure relates to mechanisms for efficient management of system data.

2. Description of the Related Art

Data storage systems maintain various types of system data in the course of their normal operation. System data can include, for example, logical to physical mapping information, listing of defective physical locations, allocation information, and so on. However, managing system data involves substantial overhead, such as during performing data storage operations and housekeeping tasks. This may in turn cause the performance of data storage systems to regress. Accordingly, it is desirable to provide more efficient mechanisms for managing system data.

BRIEF DESCRIPTION OF THE DRAWINGS

Systems and methods that embody the various features of the invention will now be described with reference to the following drawings, in which.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

Data storage systems generate and maintain various types of system data for performing data storage operations and housekeeping tasks. For example, system data can include allocation information that groups physical locations or data allocation units into sets of data allocation units (e.g., into superblocks) so that at least some data storage operations can be performed concurrently. Data allocation units can correspond to solid-state memory blocks a block, magnetic storage zone, etc. As another example, system data can include memory defect information that records and tracks defective allocation units so that user data is not stored in such defective allocation units. As yet another example, system data can include spare information that records and tracks free (or not associated with any set) memory allocation units. Because system data can be voluminous, reduction of system data redundancy and efficient organization and management of system data can improve performance of data storage systems.

Embodiments of the present invention are directed to mechanisms for managing system data that efficiently organize system data and reduce system data redundancy. In some embodiments, memory allocation information comprises a block allocation map, which can be implemented or represented using any suitable data structure, such as array, graph, table, tree, etc. The map can be configured to track defective physical locations or allocation units (e.g., defective blocks). The map can be further configured to provide information related to the grouping(s) of physical locations or allocation units into sets of physical locations or allocation units (e.g., groupings of blocks into superblocks). The structure of the map can provide information for locating a particular memory location in the physical memory. In some embodiments, separate defective blocks list or table and superblock table are not needed. Further, in some embodiments data allocation units can be grouped at initialization (e.g., blocks can be assigned to respective superblocks) so that a separate spare data allocation unit (e.g., block) list or table is not needed.

In some embodiments of the present invention, a data storage system comprising a non-volatile memory array can be configured to perform memory operations (e.g., program, erase, etc.) by determining whether a particular physical location or data allocation unit (e.g., block) is not marked as defective in the block allocation map. If the block is not marked as defective, the data storage system can be configured to perform the data storage operation (e.g., program, erase, etc.) on that block. If the block is marked as defective, the data storage system can be configured to select another block from the same group of blocks as the block marked as defective and perform the data storage operation (e.g., program, erase, etc.) on the selected block. The arrangement of the defect data in the block allocation map can provide information related to grouping(s) of blocks so that the data storage system does not comprise a separate table configured to record the grouping(s). In some embodiments, the block allocation map can be configured such that a physical location in the non-volatile memory array of a particular block can be inferred from the layout of the block allocation map.

System Overview

Figure 1A:
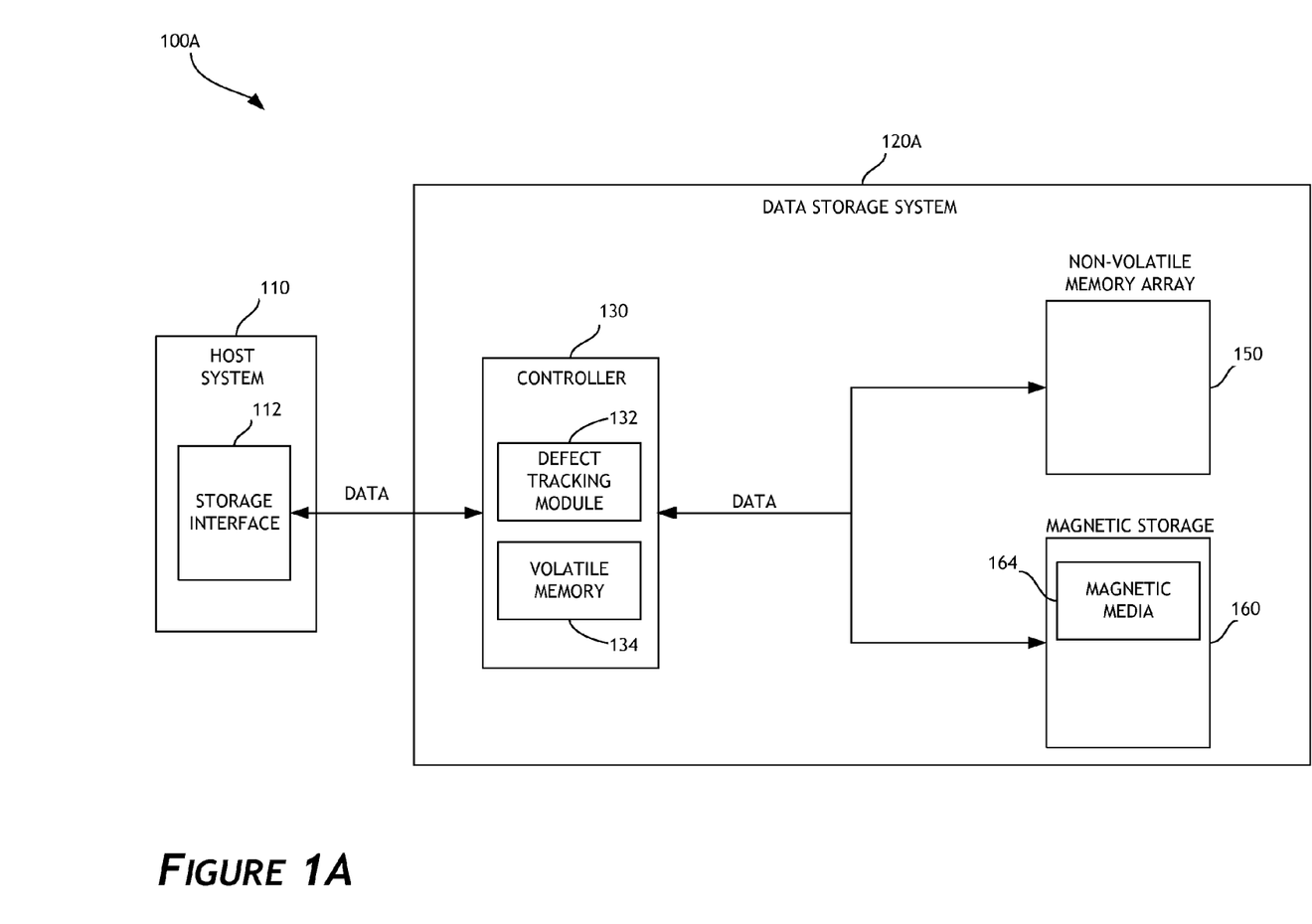
FIG. 1A illustrates a combination of a host system and a data storage system that implements mechanisms for efficient management of system data according to one embodiment of the invention.

FIG. 1A illustrates a combination 100A of a host system and a data storage system that implements mechanisms for efficient management of system data according to one embodiment of the invention. As is shown, the data storage system 120A (e.g., a hybrid disk drive) includes a controller 130, a non-volatile memory array 150, and magnetic storage 160, which comprises magnetic media 164. The non-volatile memory array 150 comprises non-volatile memory, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. Non-volatile memory can be organized into chips, dies, planes, and channels. Non-volatile memory can be partitioned into blocks that can comprise one or more pages, which can comprise one or memory locations configured to store data. The data storage system 120A can further comprise other types of storage.

The controller 130 can be configured to receive data and/or storage access commands from a storage interface module 112 (e.g., a device driver) of a host system 110. Storage access commands communicated by the storage interface 112 can include write data (or program data) and read data commands issued by the host system 110. Read and write commands can specify a logical address (e.g., LBA) used to access the data storage system 120A. The controller 130 can execute the received commands in the non-volatile memory array 150, magnetic storage 160, etc.

Data storage system 120A can store data communicated by the host system 110. In other words, the data storage system 120A can act as memory storage for the host system 110. To facilitate this function, the controller 130 can implement a logical interface. The logical interface can present to the host system 110 data storage system's memory as a set of logical addresses (e.g., contiguous address) where host data can be stored. Internally, the controller 130 can map logical addresses to various physical memory locations (referenced by addresses) in the non-volatile memory array 150 and/or other storage modules. The controller 130 includes a defect tracking module 132 configured to manage at least some system data (e.g., manage the block allocation map). The controller 130 can include volatile memory 134 for efficiently storing and accessing data, such as frequently used system data. In other embodiments, volatile memory 134 can be located outside the controller 130.

Figure 1B:
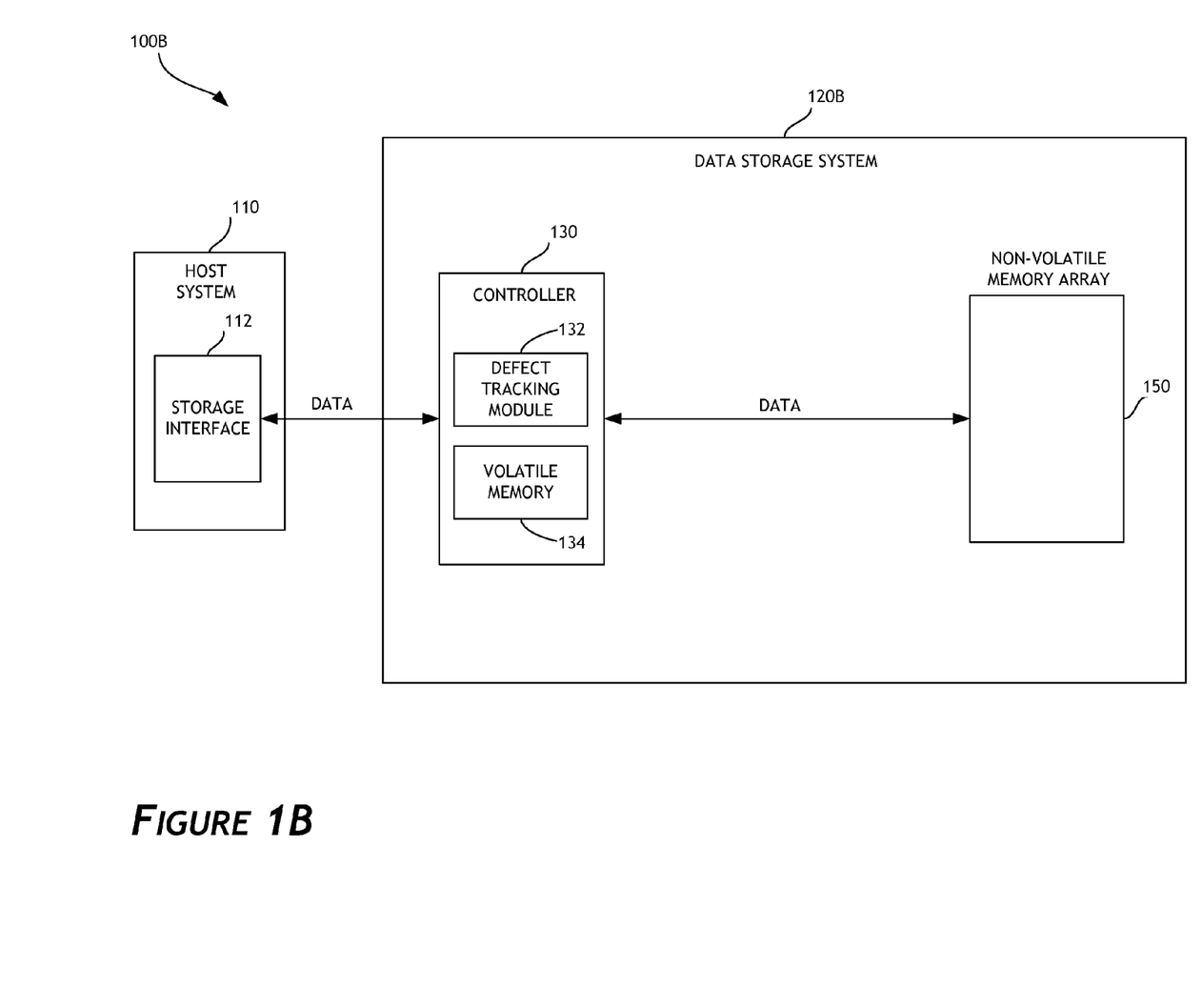
FIG. 1B illustrates a combination of a host system and a data storage system that implements mechanisms for efficient management of system data according to another embodiment of the invention.

FIG. 1B illustrates a combination 100B of a host system and a data storage system that implements mechanisms for efficient management of system data according to another embodiment of the invention. As is illustrated, data storage system 120B (e.g., solid-state drive) includes a controller 130 and non-volatile memory array 150. These and other components of the combination 100B are described above.

Efficient Management of System Data

Figure 2:
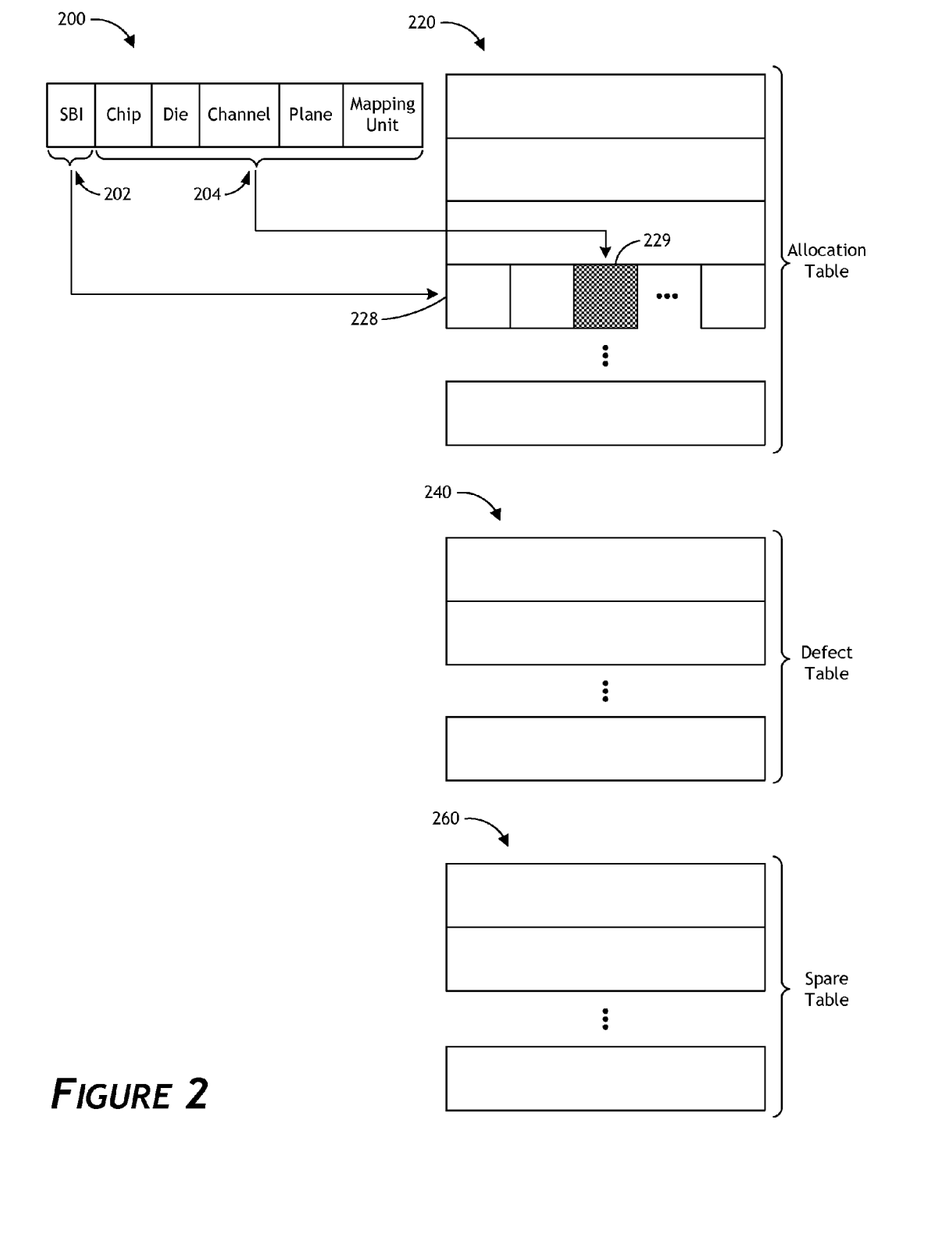
FIG. 2 illustrates various types of system data according to one embodiment of the invention.

FIG. 2 illustrates various types of system data according to one embodiment of the invention. System data can be managed by the controller 130 and/or defect tracking module 132. As is illustrated, system data includes allocation table 220, defect table 240, and spare table 260. In other embodiments, other types of system data can be included. The allocation table 220 can indicate or record associations between data allocation units (e.g., blocks) and groups of data allocation units (e.g., superblocks). The defect table 240 can indicate or record which data allocation unit(s) are defective (e.g., not suitable for storing data). The spare table can indicate which data allocation unit(s) are free (e.g., not mapped to any group of data allocation units).

In one embodiment, physical addresses corresponding to memory locations configured to store data can be associated with or referenced by a Physical Chunk Number (PCN). The PCN 200 comprises information that indexes into the allocation table 220. In the illustrated embodiment, the SBI (superblock index) field 202 can be utilized as an index into a particular row 228 of the allocation table 220. The row can be associated with a set of data allocation units (e.g., superblock). The remaining fields 204, such as chip, die, channel, plane, and mapping unit, can be utilized as an index into a particular column 229 within the row 228. Accordingly, the PCN 200 can be used to locate information corresponding to the physical location the PCN corresponds to in the allocation table 220. This information can indicate, for example, the logical address with which the physical address is associated.

In one embodiment, the data storage system 120A and/or 120B (e.g., via the controller 130 and/or the defect tracking module 132) can utilize the allocation table 220 to perform a data access operations (e.g., a program and/or erase). The data storage system can also determine whether a particular memory location is defective. This can be accomplished by looking up defect information in the defect table 240. In addition, the data storage system can utilize the spare table 260 to swap out a defective memory location or data allocation unit that comprises the defective memory location with a spare, non-defective one. Accordingly, as the data storage system accesses (and updates) all three system data tables, the overhead associated with storage and searching system data during performance of data access operations can be substantial.

Figure 3:
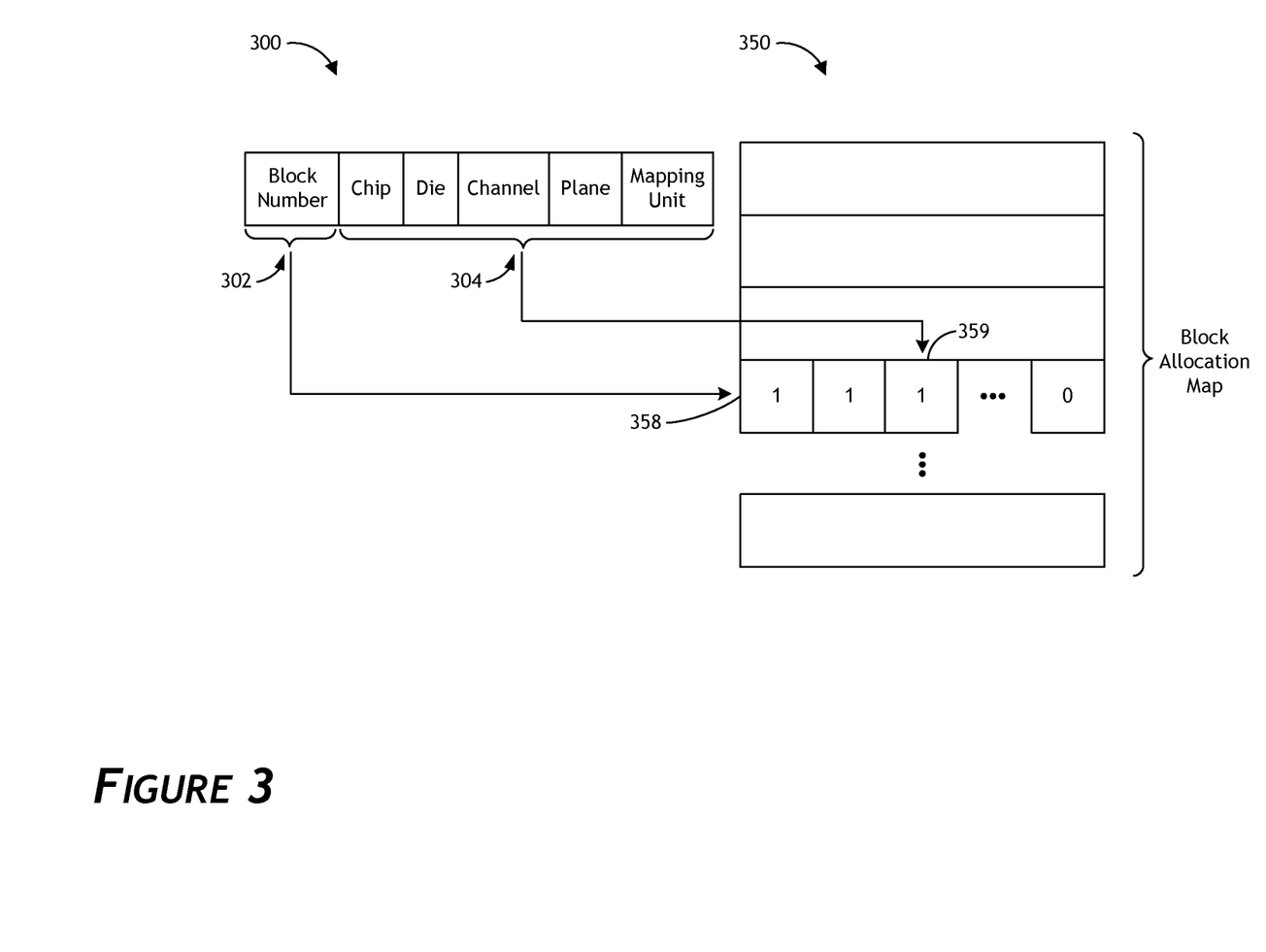
FIG. 3 illustrates a block allocation map according to one embodiment of the invention.

FIG. 3 illustrates a block allocation map according to one embodiment of the invention. Block allocation map 350 can be managed by the controller 130 and/or defect tracking module 132. As is further explained below, the block allocation map 350 can record associations between memory location or data allocation units (e.g., blocks) and groups of memory location or data allocation units (e.g., superblocks), and can further record which memory locations or data allocation unit are defective (e.g., not suitable for storing data). In addition, data the block allocation map 350 can comprise information for locating a particular memory location or data allocation unit in physical memory. Further, in one embodiment, all data allocation units (e.g., blocks) can be associated with a particular group of data allocation units (e.g., superblock) when the data storage system 120A and/or 120B is initialized. Accordingly, the spare table may not be needed.

In one embodiment, physical addresses corresponding to memory locations configured to store data can be associated with or referenced by a PCN. The PCN 300 comprises information that indexes into the allocation table 350. In the illustrated embodiment, the SBI (superblock index) or block number field 302 can be utilized as an index into a particular row 358 of the allocation table 350. Rows can correspond to groupings of sets of memory location or data allocation units (e.g., superblocks). The remaining fields 304, such as chip, die, channel, plane, and mapping unit, can be utilized as an index into a particular column 359 within the row 358. Accordingly, the PCN 300 can be used to locate information corresponding to the physical address the PCN identifies in the allocation table 350. This information can indicate, for example, defect information and the logical address with which the physical address is associated.

Figure 4:
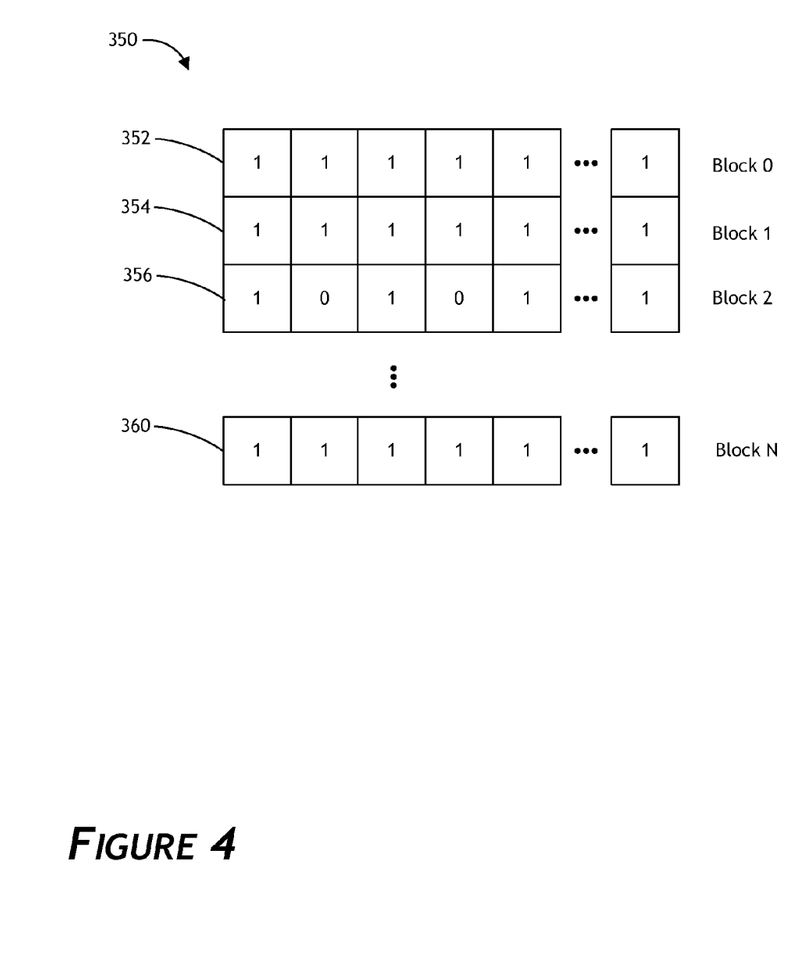
FIG. 4 illustrates the block allocation map of FIG. 3 according to one embodiment of the invention.

FIG. 4 illustrates the block allocation map 350 of FIG. 3 according to one embodiment of the invention. Rows 352, 354, 356, 360, and so on can correspond to groups of data allocation units (e.g., superblocks). In other embodiments, the rows can correspond to data allocation units (e.g., blocks) or any other memory location or set of memory locations. As is illustrated, row 352 can correspond to the superblock associated with block 0, row 354 can correspond to the superblock associated with block 1, row 356 can correspond to the superblock associated with block 2, row 360 can correspond to the superblock associated with block N, and so on. In one embodiment, the block allocation map 350 can comprise a bitmap, in which binary 0 can indicate that the corresponding memory location is defective, and binary 1 can indicate that the corresponding memory location is not defective. In other embodiments, other suitable data structures can be used in place of or in addition to the bitmap.

In one embodiment, the data storage system 120A and/or 120B (e.g., via controller 130 and/or defect tracking module 132) can populate the block allocation map 350 as follows. At initialization of the data storage system 120A and/or 120B, the defective memory locations list (e.g., generated and stored in the non-volatile memory array 150 by the non-volatile memory array vendor) can be used to mark corresponding locations or entries in the block allocation map 350 as defective. Further, locations or entries in the block allocation map 350 corresponding to the memory locations that become defective during operation of the data storage system 120A and/or 120B (e.g., become defective during execution of read, program, and/or erase operations), can be marked as defective. In one embodiment, the data storage system 120A and/or 120B (e.g., via controller 130 and/or defect tracking module 132) can efficiently generate a list of defective memory locations by scanning the block allocation map 350. For example, the block allocation map 350 can be scanned for binary zeroes, which indicate that the corresponding memory location is defective.

In one embodiment, a working copy of the block allocation map 350 can be stored in the volatile memory 134 during normal operation of the data storage system 120A and/or 120B. When there is an interruption and/or loss of power (e.g., restart, shutdown, blackout, brownout, etc.), the data storage system 120A and/or 120B (e.g., via the controller 130 and/or the defect tracking module 132) can store the working copy of the block allocation 350 map in non-volatile memory, such as in the non-volatile memory array 150 and/or magnetic storage 160. This non-volatile copy of the block allocation map 350 can be loaded into the volatile memory 134 when the data storage system 120A and/or 120B is subsequently powered up.

Figure 5:
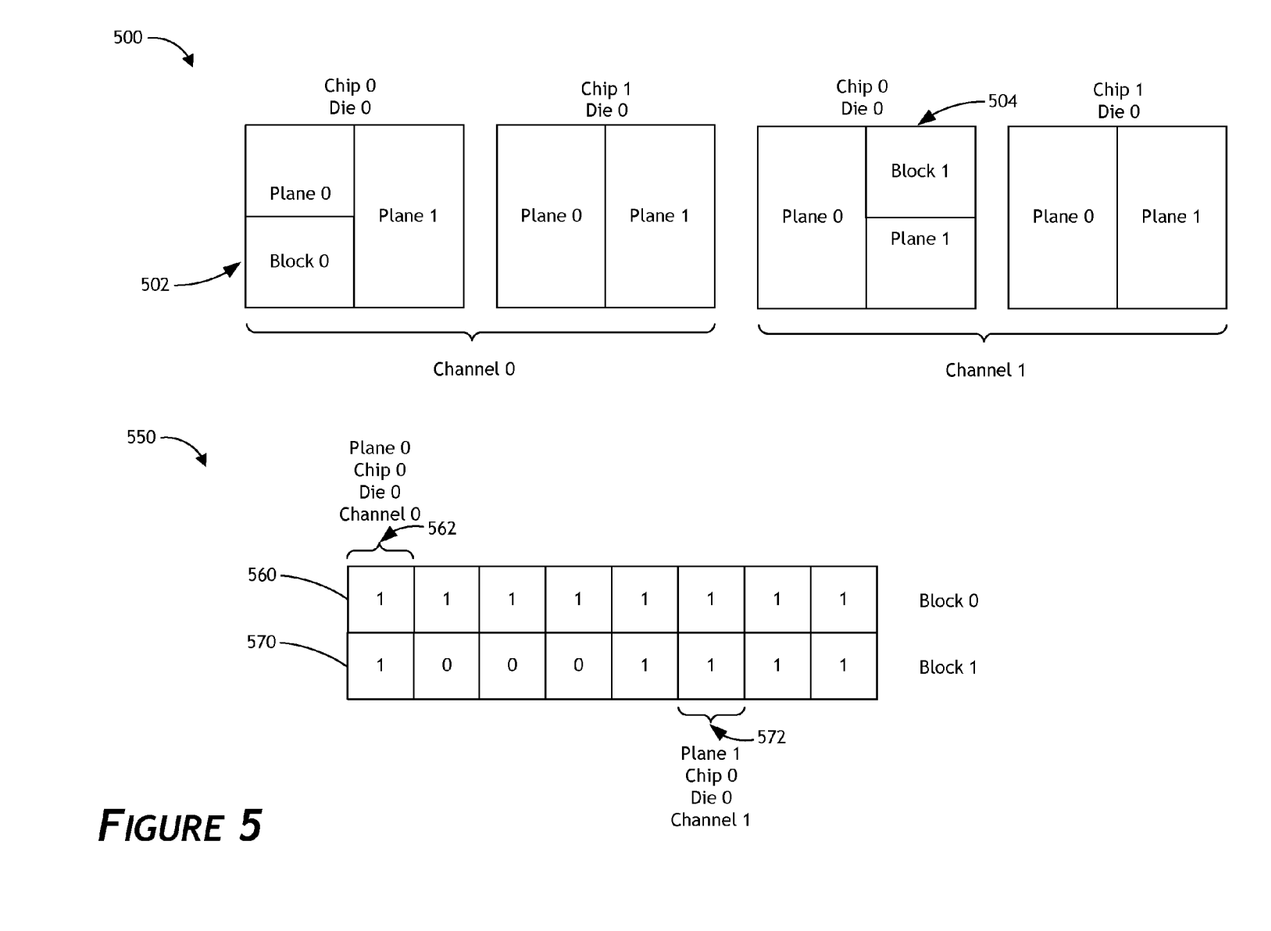
FIG. 5 illustrates a block allocation map associated with a non-volatile memory array configuration according to one embodiment of the invention.

FIG. 5 illustrates a block allocation map 550 associated with a non-volatile memory array configuration 500 according to one embodiment of the invention. Block allocation map 550 can be managed by the controller 130 and/or defect tracking module 132. Non-volatile memory array 500 can comprise or be configured as two chips (Chip 0 and Chip 1) arranged on a single die (Die 0). Non-volatile memory array 500 can comprise or be configured to have two channels (Channel 0 and Channel 1). In addition, the non-volatile memory array 500 can comprise or be configured to have two planes (Plane 0 and Plane 1) that comprise a plurality of blocks. The blocks can be grouped into sets (or superblocks), such as Block 0 superblock and Block 1 superblock, so that so that at least some data storage operations can be performed concurrently. Superblocks can comprise blocks associated with each chip/die/plane/channel combination. In other embodiments, other suitable configurations of non-volatile memory array can be used.

In one embodiment, the block allocation map 550 can comprise entries corresponding to memory locations (e.g., pages) in each set of blocks (e.g., each superblock). As is illustrated, row 560 comprises entries corresponding to the Block 0 superblock and row 570 comprises entries corresponding to the Block 1 superblock. For example, entry 562 can correspond to memory location 502, which is a location (or set of locations or entire) in Block 0 in Plane 0, Chip 0, Die 0, and Channel 0. As another example, entry 572 can correspond to memory location 504, which is a location (or set of locations or entire) Block 1 in Plane 1, Chip 0, Die 0, and Channel 1. Accordingly, each entry in the block allocation map 550 is associated with the physical memory location in the non-volatile memory array 500, and the exact physical locations in memory can be inferred from the layout of the block allocation map 550 (e.g., bitmap).

In one embodiment, as is illustrated, entries in the block allocation map 550 can indicate whether the corresponding memory location is defective. For example, entries having binary 0 can represent defective memory location, while entries having binary 1 can represent non-defective memory locations. In one embodiment, as is illustrated, all memory location of the non-volatile memory array 500 can be associated with a particular group or set of memory locations (e.g., superblocks) when the data storage system 120A and/or 120B is initialized. Accordingly, no spare memory locations may exist after the data storage system has been initialized, and a spare table may not be needed.

Figure 6:
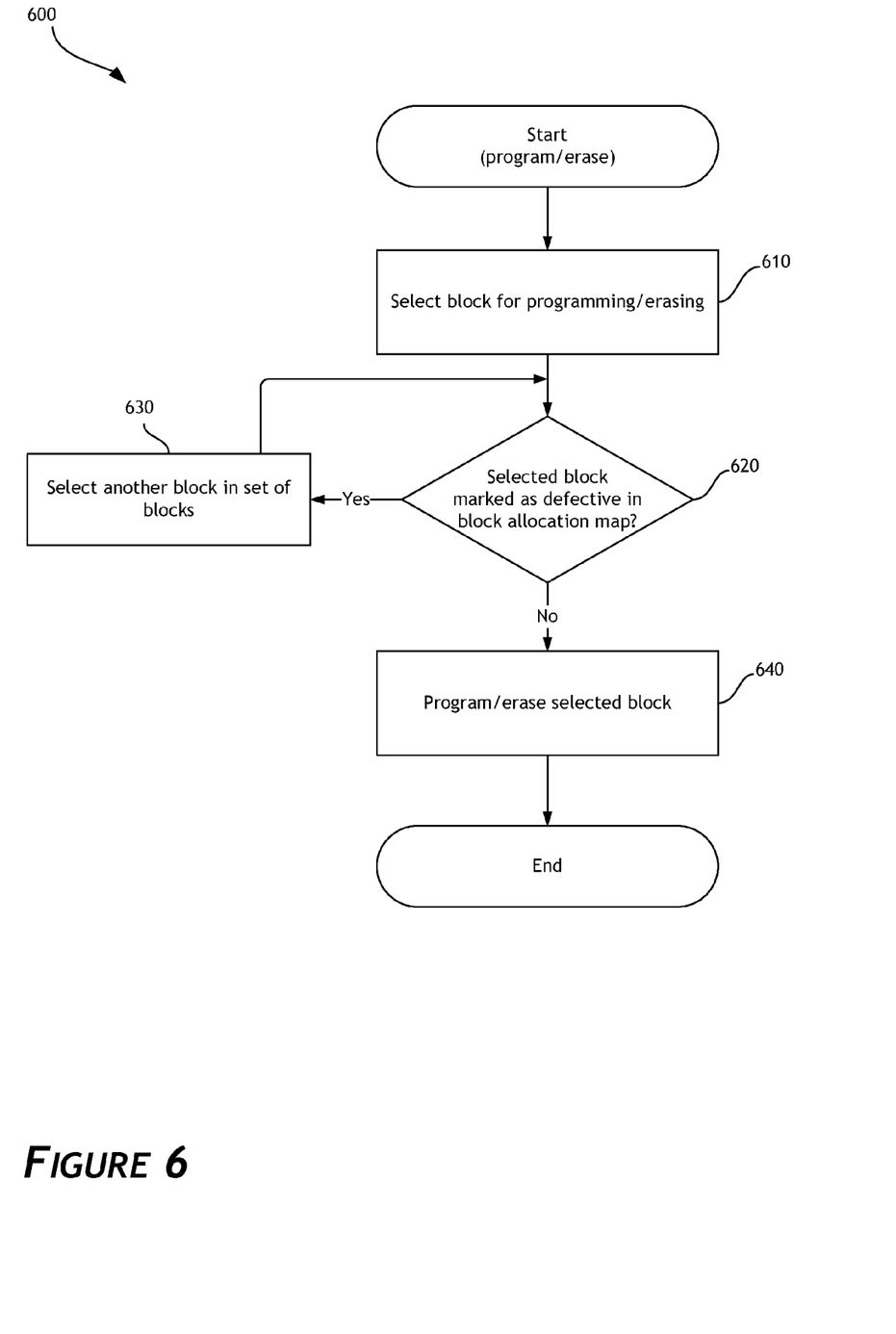
FIG. 6 is a flowchart illustrating a process of performing program and/or erase operation according to one embodiment of the invention.

FIG. 6 is a flowchart illustrating a process 600 of performing program and/or erase operation according to one embodiment of the invention. The process 600 can be performed by the controller 130 and/or the defect tracking module 132. The process 600 can begin in block 610 where it can select a physical location (e.g., block) for programming and/or erasing. The process 600 can transition to block 620 where in can determine whether the selected physical location is marked as defective in the block allocation map (e.g., in the block allocation map 350). In one embodiment, the process 600 can determine whether an entry in the block allocation map corresponding to the selected physical location comprises a binary 0. If the process 600 determines that the entry corresponding to the selected physical location is not marked as defective, the process can transition to block 640 where it can program and/or erase the selected physical location. The process 600 can then terminate.

If the process 600 determines that the selected physical location is marked as defective, the process can transition to block 630 where it can select another physical location for programming and/or erasing. In one embodiment, the process 600 can select another physical location from the same group or set of physical locations (e.g., the same superblock) as the defective physical location selected in block 610. In another embodiment, the process 600 can select any other physical location whether from the same group or set of physical locations. The process can then transition to block 620 where it determines whether the selected physical location is marked as defective. In other embodiments, the process 600 can be used for performing operations other than programming and/or erasing.

CONCLUSION

Embodiments of data storage systems disclosed herein are configured to efficiently manage system data. This can be accomplished by efficiently organizing system data and reducing system data redundancy. In one embodiment, memory allocation information (e.g., block allocation map) configured to track defective physical locations or allocation units (e.g., defective blocks) can be maintained. Memory allocation information can be further configured to provide information related to the grouping(s) of physical locations or data allocation units into sets of physical locations or data allocation units (e.g., groupings of blocks into superblocks) and provide information for locating the physical locations in memory. Accordingly, a separate defective blocks list or table and superblock table may not be needed. Further, a spare physical location table may not be needed. Hence, redundancy can be reduced, efficiency can be increased, and improved performance can be attained.

Other Variations

Those skilled in the art will appreciate that in some embodiments, other types of system data can be managed according to the disclosed mechanisms. Although such mechanisms are described in the context of solid-state memory block allocation information, the disclosed mechanisms can be applied to other types of system data, such as memory allocation information, sector allocation information, zone allocation information, and so on. In addition, disclosed mechanisms can be applied to other types of memory, such as magnetic storage. Further, in some embodiments, data allocation units can comprise one or more physical locations. Additional system components can be utilized, and disclosed system components can be combined or omitted. The actual steps taken in the disclosed processes, such as the processes illustrated in FIG. 6, may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A non-volatile data storage system, comprising:
a non-volatile memory array comprising a plurality of blocks configured to store data, the plurality of blocks grouped into a plurality of sets of blocks; and
a controller configured to:
maintain a block allocation map comprising defect data indicating whether the plurality of blocks are defective;
in response to determining that a first block of the plurality of blocks is not marked as defective in the block allocation map, program or erase the first block; and
in response to determining that the first block of the plurality of blocks is marked as defective in the block allocation map, select a second block in a same set of blocks as the first block and program or erase the second block,
wherein the arrangement of the defect data in the block allocation map additionally provides information related to associations of the plurality of blocks with the respective sets of blocks so that the non-volatile data storage system does not comprise a separate table configured to record the associations between the plurality of blocks and the sets of blocks.

2. The non-volatile data storage system of claim 1, wherein the block allocation map comprises a bitmap.

3. The non-volatile data storage system of claim 2, wherein the controller is further configured to infer, using a layout of the bitmap, a physical location in the non-volatile memory array of a block of the plurality of blocks.

4. The non-volatile data storage system of claim 2, wherein the bitmap comprises a single-bit entry for each block of the plurality of blocks, the entry indicating whether a corresponding block is defective.

5. The non-volatile data storage system of claim 1, wherein the block allocation map is configured to track a set of blocks that are not suitable for storing data so that the non-volatile data storage system does not comprise a separate defective block list.

6. The non-volatile data storage system of claim 1, wherein:
the block allocation map is stored in a volatile memory array during normal operation of the non-volatile data storage system; and
in response to detecting an interruption or loss of power supplied to the non-volatile data storage system, the controller is configured to store the block allocation map in the non-volatile memory array.

7. The non-volatile data storage system of claim 1, wherein:
the plurality of sets of blocks are associated with a plurality of superblocks and the plurality of blocks are grouped into the plurality of superblocks; and
the controller is further configured to perform concurrent execution of at least some data storage operations.

8. The non-volatile data storage system of claim 7, wherein each block is associated with a superblock upon initialization of the non-volatile data storage system.

9. The non-volatile data storage system of claim 1, wherein the non-volatile data storage system is a hybrid disk drive.

10. The non-volatile data storage system of claim 1, wherein controller is configured to perform a program or erase operation.

11. In a non-volatile data storage system comprising a controller and a non-volatile memory array comprising a plurality of blocks configured to store data, the plurality of blocks grouped into a plurality of sets of blocks, a method of programming or erasing data, the method comprising:
maintaining a block allocation map comprising defect data indicating whether the plurality of blocks are defective;
in response to determining that a first block of the plurality of blocks is not marked as defective in the block allocation map, programming or erasing the first block; and
in response to determining that the first block of the plurality of blocks is marked as defective in the block allocation map, selecting a second block in a same set of blocks as the first block and programming or erasing the second block,
wherein the arrangement of the defect data in the block allocation map additionally provides information related to associations of the plurality of blocks with the respective sets of blocks so that the non-volatile data storage system does not comprise a separate table configured to record the associations between the plurality of blocks and the sets of blocks, and
wherein the method is performed under the control of the controller.

12. The method of claim 11, wherein the block allocation map comprises a bitmap.

13. The method of claim 12, further comprising inferring a physical location in the non-volatile memory array of a block of the plurality of blocks using the bitmap.

14. The method of claim 12, wherein the bitmap comprises a single-bit entry for each block of the plurality of blocks, the entry indicating whether a corresponding block is defective.

15. The method of claim 11, wherein the block allocation map is configured to track a set of blocks that are not suitable for storing data so that the non-volatile data storage system does not comprise a separate defective block list.

16. The method of claim 11, further comprising:
   storing the block allocation map in a volatile memory array during normal operation of the non-volatile data storage system; and
   in response detecting an interruption or loss of power supplied to the non-volatile data storage system, storing the block allocation map in the non-volatile memory array.

17. The method of claim 11, wherein:
   the plurality of sets of blocks are associated with a plurality of superblocks and the plurality of blocks are grouped into the plurality of superblocks, and
   the method further comprises performing concurrent execution of at least some data storage operations.

18. The method of claim 17, further comprising associating each block with a superblock during initialization of the non-volatile data storage system.

19. The method of claim 11, wherein the non-volatile data storage system comprises a hybrid disk drive.

20. The method of claim 11, wherein the programming or erasing is performed in response to receiving a program or erase command.

* * * * *